United States Patent [19]
Olson

[11] 3,722,667
[45] Mar. 27, 1973

[54] DUAL WIPING DEVICE FOR A CONVEYOR BELT IN WHICH BOTH WIPERS HAVE A COMMON PIVOTAL SUPPORT BUT OPERATE INDEPENDENTLY OF EACH OTHER

[76] Inventor: Laddie B. Olson, 24960 Townsend Avenue, Haywood, Calif. 94544

[22] Filed: June 14, 1971

[21] Appl. No.: 152,673

[52] U.S. Cl................................................198/230
[51] Int. Cl..............................................B65g 45/00
[58] Field of Search......................................198/230

[56] References Cited

UNITED STATES PATENTS 3,598,231  8/1971  Matson................................198/230
1,036,125  8/1912  King...................................198/230 X Primary Examiner—Edward A. Sroka
Attorney—William R. Piper

[57] ABSTRACT

Dual wipers for a conveyor belt in which both wipers have the same pivotal support and carry transversely extending wiping members with respect to the belt being wiped. Both wiping members are disposed on the same side of the common pivotal support and each has an independent adjustable weight or spring disposed on the other side of the pivotal support that yieldingly holds its wiping member in contact with the belt and independently of the other wiping member.

5 Claims, 3 Drawing Figures

PATENTED MAR 27 1973
3,722,667
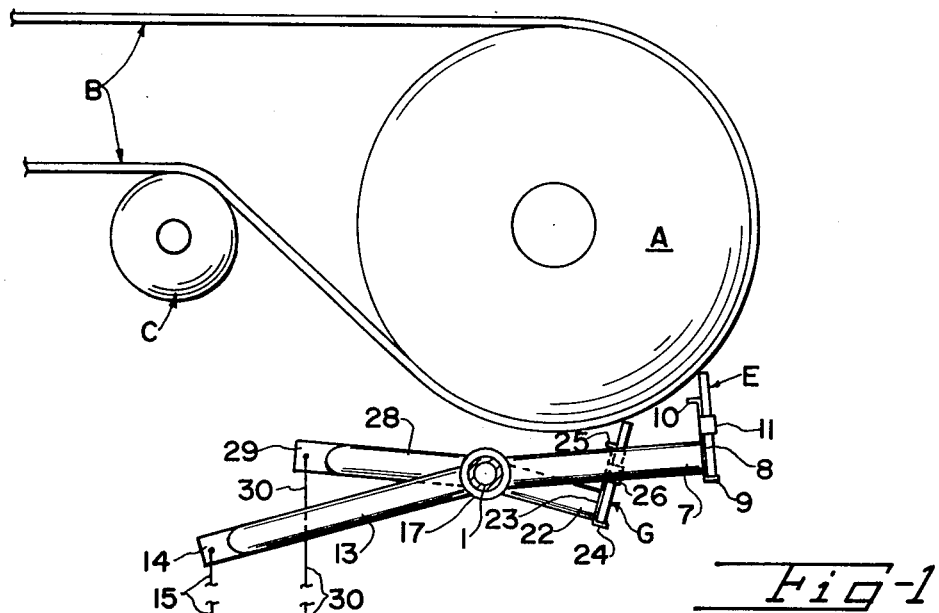
Fig-1
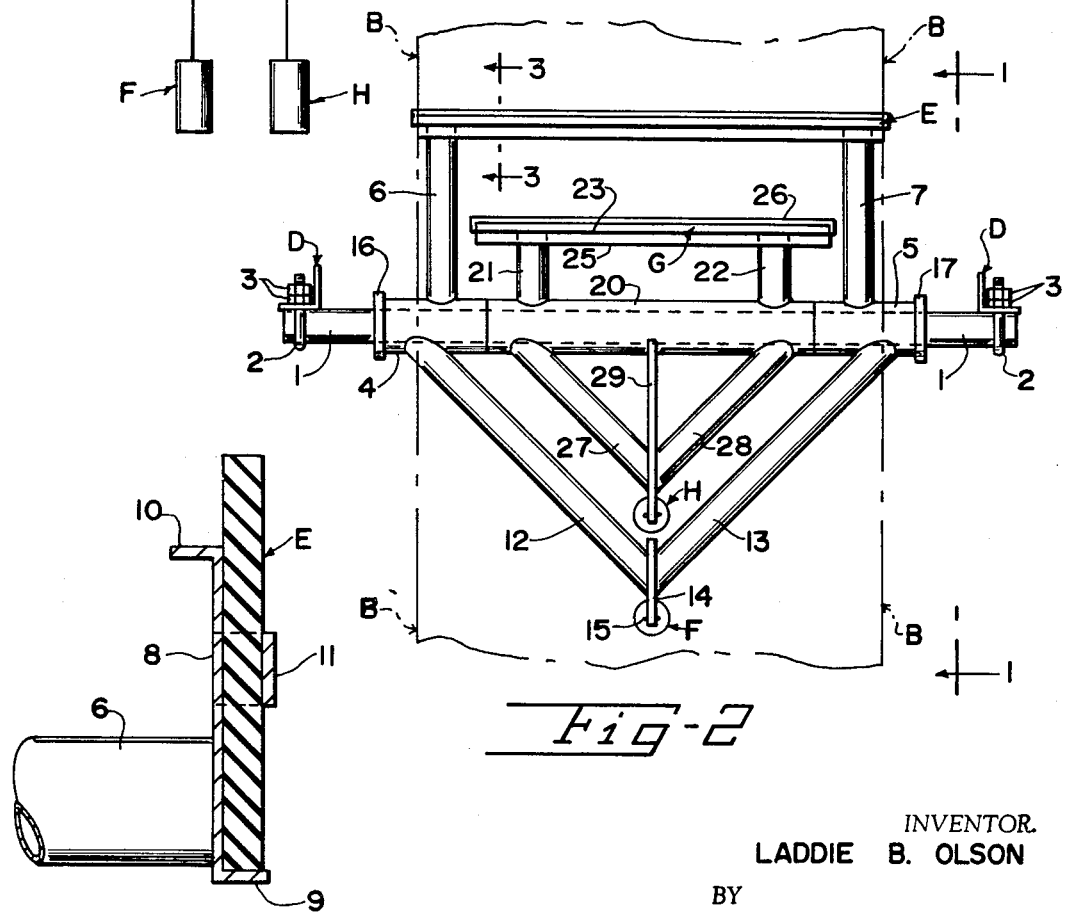
Fig-2
Fig-3
INVENTOR.
LADDIE B. OLSON
BY
William R. Piper
ATTORNEY

DUAL WIPING DEVICE FOR A CONVEYOR BELT IN WHICH BOTH WIPERS HAVE A COMMON PIVOTAL SUPPORT BUT OPERATE INDEPENDENTLY OF EACH OTHER

BACKGROUND OF THE INVENTION

1. Field of the Invention

Wipers for conveyor belts fail to work properly under all and varying conditions regardless of what material is used for the wiping element, such as metal, rubber, a revolving brush, a beater, etc. I have found that it is necessary to have two wipers in which the wiping elements differ from each other in a varying degree of hardness. Both of these wipers when mounted on a common pivotal support will conserve space. The outer or first wiper can have a metal wiping element that can take care of icy conditions of the belt or where the belt is conveying sticky material. The second wiper can use the same pivotal support as the first wiper and the wiping element of the second wiper could be of rubber and the rubber element be disposed nearer to the common pivot support than that of the metal wiping element. Other materials could be used for the wiping elements.

2. Description of the Prior Art

The patent to Francis E. McGovern, U.S. Pat. No. 2,514,780, on a wiping mechanism for conveyor belts, issued July 11, 1950, discloses a first pair of parallel arms swingable about a pivot. Each of these arms pivotally carries a second arm with the pivot points being at the centers of the second arms. A rectangular cradle is pivotally carried by each outer end of each second arm and each cradle supports a pair of wiping elements, these being disposed on each side of the pivotal connection of the cradle with the second arm. This structure provides four wiping elements that are yieldingly held in contact with the conveyor belt by counterweights adjustably mounted on the first pair of arms and on the opposite side of the pivot for the first arms from the four wiping elements.

The pair of wiping elements carried by a single cradle are disposed on each side of a central pivotal support which means that when one wiping element moves toward the conveyor belt, the other wiping element must move away from the belt an equivalent distance. In the present invention each wiping element operates independently of the other although both have the same pivotal support. Also in the above-mentioned patent, one cradle with its pair of wiping elements is pivotally carried at the forward ends of a pair of parallel and spaced apart arms. Then a second cradle with its pair of wiping elements is pivotally carried at the rear ends of the same pair of parallel and spaced apart arms. These parallel and spaced apart arms are then pivotally connected at their midpoints to two other parallel arms that have a common pivot point and are provided with adjustable counterweights to cause the four wiping elements on the two cradles to contact the conveyor belt with the desired force. Again it should be noted that when the pair of wiping elements carried by one of the cradles is caused to move toward the conveyor belt, the other pair of wiping elements carried by the other cradle will be caused to move away from the belt an equivalent distance. This is not true with my present invention as already explained.

SUMMARY OF THE INVENTION

An object of my invention is to provide a dual wiping device for a conveyor belt in which both wiping elements have a common pivotal support, but operate independently of each other. In many cases a single wiping element is not sufficient to keep a conveyor belt clean. In icy weather or when the conveyor belt is handling extremely sticky material, a single wiping element cannot wipe the material from the belt without tearing or excessively wearing away the belt. If the belt becomes worn or jagged, it permits fine strips of unwiped material to pass through. For this reason a second wiping element is provided in my device. The novel features of my device are the provision of a common pivot for both of the wiping elements, the positioning of both of the wiping elements on the same side of the common pivot support, and the independent operation of each wiping element from the other.

BRIEF DESCRIPTION OF THE DRAWING

FIG. 1 is a side elevation of my device when looking in the direction of the arrows 1—1 of FIG. 2, the tubular pivotal support for the two conveyor belt wipers being shown in section.

FIG. 2 is a top plan view of FIG. 1 and omits showing the head pulley and the conveyor belt as well as the snub pulley.

FIG. 3 is an enlarged transverse section through the outer wiping element and its support, and it is taken along the line 3—3 of FIG. 2.

DESCRIPTION OF THE PREFERRED EMBODIMENT

In carrying out my invention, I illustrate by way of example a head pulley, indicated generally at A, a conveyor belt B and a snub pulley C, see FIG. 1. The frame for supporting my device is shown in FIG. 2 and is not shown in FIG. 1. Any type of frame may be used and I have indicated in FIG. 2 a pair of spaced apart and parallely arranged angle irons, indicated at D, D. A tubular member 1 extends transversely between the two parallel angle irons D and is secured in place by any means, such as by U-bolts 2 and nuts 3, as shown in FIG. 2.

My device comprises an outer conveyor belt wiper and an inner conveyor belt wiper. I will first describe the outer belt wiper and will follow this by a description of the inner belt wiper. The outer wiper for the conveyor belt consists of two short sleeves 4 and 5 that are rockably mounted on the tubular support 1 and are spaced apart. The sleeve 4 carries a radially extending arm 6 which is preferably tubular and hollow to make it light in weight and yet strong. The arm 6 is welded or otherwise secured to the sleeve 4. In like manner, the sleeve 5 carries a radially extending arm 7 that lies in the same plane as the arm 6 and also is tubular and hollow to make it light in weight. The arm 7 is preferably welded to the sleeve 5.

The arms 6 and 7 are of the same length and their outer ends are welded or otherwise secured to a transversely extending carrier 8 that supports a conveyor belt wiping element E, see FIGS. 2 and 3. The wiping element E may be made of any material desired, such as rubber or metal. The wiper carrier 8 has a flange 9 at its lower edge that will support the wiping element E. The upper edge of the carrier 8 has a rearwardly extending flange 10 that will give rigidity to the carrier. A transversely extending strap 11 extends across the outer face of the wiping element E and the ends of the strap may be bent at right angles and welded to the ends of the carrier 8. The length of the wiping element E is coextensive with the length of the carrier 8 and the pivotal support 1 for the wiping element and its supporting frame is disposed close enough to the head pulley A that the wiping element will extend transversely across the width of the conveyor belt B. The belt B is shown by dot-dash lines in FIG. 2.

The wiping element E is yieldingly held in contact with the conveyor belt B by rearwardly extending and angularly inclined arms 12 and 13, see FIGS. 1 and 2, and a weight F that is connected to the two inclined arms at their juncture by a plate 14 and a cable 15 extending from the plate to the weight. The forward ends of the arms 12 and 13 are welded or otherwise secured to the sleeves 4 and 5 that are rockably mounted on the tubular pivotal support 1. The weight F can be adjusted to cause the wiping element to contact the conveyor belt B with the desired amount of pressure. The sleeves 4 and 5 are held from any lateral movement along the tubular member 1 by collars 16 and 17, see FIG. 2. A coil spring, not shown, could be substituted for the weight F, if desired. The plate 14 is preferably welded between the rear ends of the angularly and rearwardly extending arms 12 and 13.

I provide a second and inner wiping element G whose supporting frame is also rockably carried by the tubular transversely extending pivotal support 1, see FIGS. 1 and 2. A part of the supporting frame for the inner wiping element G includes an elongated sleeve 20 rockably mounted on the tubular member 1, and positioned between the two sleeves 4 and 5, see FIG. 2. The ends of the sleeve 20 contact with the inner ends of the sleeves 4 and 5 so as to prevent any lateral movement of the sleeve 20 along its tubular support 1. A pair of tubular arms 21 and 22 are welded near the ends of the sleeve 20 and these arms are parallely arranged with respect to each other and extend radially from the axis of the sleeve 20. A transversely extending carrier 23 is welded to the outer ends of the two arms 21 and 22 and the carrier has a lower flange 24, see FIG. 1, that supports the lower edge of the inner wiping element G. The length of the carrier 23 is coextensive with the length of the inner wiping element G and both are free to swing between the pair of arms 6 and 7, as is clearly shown in FIG. 2. The inner carrier 23 has an upper and rearwardly extending flange 25 for giving rigidity to the carrier. The top of the inner wiping element G extends above the upper flange 25 of the inner carrier 23. A transversely extending strap 26 engages with the outer face of the wiping element G for holding it in the carrier 23 and the ends of the strap are bent at right angles and are secured to the ends of the carrier. It will be seen that the support for the inner conveyor belt wiping element G is substantially the same as the support for the outer wiping element E.

The inner wiping element G is yieldingly held in contact with the conveyor belt B by rearwardly extending and angularly inclined arms 27 and 28, see FIGS. 1 and 2, and by a weight H that is connected to the two inclined arms by a plate 29 and a cable 30 extending from the plate to the weight H. The forward ends of the angled tubular arms 27 and 28 are welded or otherwise secured to the inner sleeve 20 while the rear ends of the same arms are welded to the plate 29. The forward end of the plate 29 may be welded to the sleeve 20 while the rear end of the plate has the cable 30 connected thereto. It is obvious that a coil spring could be substituted for the weight H. The angled arms 27 and 28 and the plate 29 are free to swing within the confines of the angled arms 12 and 13 and the sleeves 4 and 5, see FIG. 2.

OPERATION

From the foregoing description of the various parts of the device, the operation thereof will be clearly understood. There are several advantages due to having a device in which an outer and an inner wiping element pivot about a common tubular member 1 and operate independently of each other. The main advantage is to provide a device that will effectively clean a conveyor belt of any residual matter that might cling to the belt after the belt delivers its load as it travels around the head pulley A. The outer wiping element E might preferably be made of metal in order to withstand the tendency of an extremely sticky or icy material to adhere to the conveyor belt. The inner wiping element G might be made of rubber. It is often necessary to provide two wiping members E and G of varying degrees of hardness. More than one wiper takes up additional space and, therefore, the ideal condition is to have both wipers operate off from a single pivotal support and have the inner wiper G disposed within the frame that supports the outer wiper E. This can be accomplished by disposing the frame that supports the inner wiping element G within the frame that supports the outer wiping element E. Thus the inner wiper supporting frame occupies space that would otherwise be not used. The dual conveyor wiping device can therefore occupy no more space than that required for the frame which supports the outer wiping element.

With this construction it will be seen that both outer and inner wiping elements can be shifted as a unit by merely moving the common tubular supporting member 1 around which each of the wiper supporting frames is free to pivot independently of each other. The particular type of mounting illustrated in FIGS. 1 and 2 for the two wiping elements E and G will permit the two wiping elements to work on any diameter head pulley A. The two wiping elements can operate off from the crown of the head pulley or any other position up to the snub pulley C. It is possible to have the pivotal support 1 for the two wiping elements E and G to be swung around the axis of the head pulley A, thereby changing the dual wipers to any ideal position desired. The head pulley A is usually crown-shaped so as to have its greatest diameter at the midpoint of the head pulley. In this case the outer wiping element E could be in two sections with the innermost abutting edges of the two sections being aligned with the midpoint of the head pulley. One wiper element E could be provided if its outer edge were cut to form a shallow V so that the slopes of the edge portions from the center of the V would correspond to the tapered portions of the crown pulley.

Most conveyor belts B have a snub pulley in order to increase the angle of wrap that the belt has with its head pulley. This reduces the area of belt length in which the belt wiper can operate. In my invention I mount the inner wiping element G and its supporting frame within the frame that supports the outer wiping element E. This is made possible because both frames for the inner and outer wiping elements pivot about a common tubular member. The inner wiping element G could be a rotating brush, not shown, that is motor driven. Both of the wiping elements E and G are easily replaceable.

I claim:

1. A dual wiping device for a conveyor belt comprising:
   a. an elongated common pivotal support arranged close to a head pulley, the axis of said elongated common pivotal support paralleling the axis of the head pulley;
   b. an outer wiping element extending substantially across the entire width of a conveyor belt that is wrapped around the head pulley;
   c. a first rigid frame supporting said outer wiping element on one side of the common pivotal support and being rockably carried by said pivotal support, said frame having a portion extending on to the opposite side of said pivotal support;
   d. a first yielding means connected to said first frame on the opposite side of said pivotal support from that which supports said outer wiping element, for yieldingly holding said first wiping element in contact with substantially the entire width of the conveyor belt;
   e. an inner wiping element extending transversely across the greater portion of the width of the conveyor belt;
   f. a second rigid frame supporting said inner wiping element in a position lying between said outer wiping element and said common pivotal support, said second frame lying within the area enclosed by said first frame and being rockably carried by said common pivotal support, said second frame having a portion extending onto the opposite side of said pivotal support and lying within the area enclosed by the portion of said first frame that extends on the opposite side of said pivotal support; and
   g. a second yielding means connected to said second frame on the opposite side of said pivotal support from that which supports said inner wiping element, for yieldingly holding said second wiping element in contact with the conveyor belt and independently of the action of said first wiping element.

2. The combination as set forth in claim 1: and in which
   a. said first frame includes a pair of spaced apart sleeves rotatably mounted on said common pivotal support;
   b. a radially extending and forwardly projecting arm rigidly connected to each sleeve; and
   c. a first carrier supporting said outer wiping element and being rigidly connected to said radially extending arms.

3. The combination as set forth in claim 2: and in which
   a. the portion of said first frame that extends on the opposite side of said pivotal support from that of said first wiping element includes a pair of rearwardly extending arms, one of the rearwardly extending arms being rigidly connected to one of said sleeves and the other rearwardly extending arm being rigidly connected to the other sleeve, both arms extending at an angle to the sleeves and meeting each other at their rear ends; and
   b. said first yielding means including a counterweight connected to said rearwardly extending arms at their juncture.

4. The combination as set forth in claim 2: and in which
   a. said second frame includes an elongated sleeve that is rotatably mounted on said common pivotal support and lies between the pair of spaced apart sleeves;
   b. a pair of radially extending arms rigidly connected to said elongated sleeve and paralleling the forwardly projecting arms that are carried by said spaced apart sleeves and lying inside of these arms; and
   c. a second carrier supporting said inner wiping element and being rigidly connected to said radially extending arms that are carried by said elongated sleeve.

5. The combination as set forth in claim 4: and in which
   a. the portion of said second frame that extends on the opposite side of said pivotal support from that of said second wiping element includes a pair of rearwardly extending arms rigidly connected to said elongated sleeve, both arms extending at an angle and lying inside of the rearwardly extending arms connected to said spaced apart sleeves, and abutting each other at their rear ends; and
   b. said second yielding means including a counterweight connected to said rearwardly extending arms at their juncture, these arms being carried by said elongated sleeve.

* * * * *